(12) United States Patent
Hess et al.

(10) Patent No.: US 11,307,852 B1
(45) Date of Patent: Apr. 19, 2022

(54) AUTOMATED GENERATION OF DEPENDENCY GRAPH BASED ON INPUT AND OUTPUT REQUIREMENTS OF INFORMATION

(71) Applicant: Snowflake Inc., Bozeman, MT (US)

(72) Inventors: Alexander Hess, Toronto (CA); Terry Marc Hardie, Union City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/515,239

(22) Filed: Oct. 29, 2021

(51) Int. Cl.
  *G06F 8/71* (2018.01)
  *G06F 11/36* (2006.01)
  *G06F 8/10* (2018.01)

(52) U.S. Cl.
  CPC ............... *G06F 8/71* (2013.01); *G06F 8/10* (2013.01); *G06F 11/3604* (2013.01)

(58) Field of Classification Search
  USPC ........................................................ 717/170
  See application file for complete search history.

(56) References Cited

U.S. PATENT DOCUMENTS

| | | | |
|---|---|---|---|
| 7,644,334 B2 * | 1/2010 | Hickman | G01R 31/31704 714/741 |
| 10,768,908 B1 * | 9/2020 | Wang | G06F 8/433 |
| 2018/0121332 A1 * | 5/2018 | Andrejko | G06F 11/3664 |

* cited by examiner

*Primary Examiner* — John Q Chavis
(74) *Attorney, Agent, or Firm* — Womble Bond Dickinson (US) LLP

(57) ABSTRACT

A system and method for automatically generating a dependency graph based on input and output requirements of information. The method includes obtaining, by a processing device, a list of a plurality of modules executing on one or more processing devices, the plurality of modules associated with a plurality of input requirements and a plurality of output requirements. Each module is configured to generate an output dataset of a respective output requirement of the plurality of output requirements based on an input dataset of a respective input requirement of the plurality of input requirements. The method includes determining, by the processing device, an execution order of the plurality of modules based on the plurality of input requirements and the plurality of output requirements. The method includes establishing, by the processing device, a plurality of connections between the plurality of modules based on the execution order.

30 Claims, 6 Drawing Sheets

600

obtaining, by a processing device, a list of a plurality of modules executing on one or more processing devices, the plurality of modules associated with a plurality of input requirements and a plurality of output requirements, each module is configured to generate an output dataset of a respective output requirement of the plurality of output requirements based on an input dataset of a respective input requirement of the plurality of input requirements
602 determining, by the processing device, an execution order of the plurality of modules based on the plurality of input requirements and the plurality of output requirements
604 establishing, by the processing device, a plurality of connections between the plurality of modules based on the execution order
606

FIG. 6

AUTOMATED GENERATION OF DEPENDENCY GRAPH BASED ON INPUT AND OUTPUT REQUIREMENTS OF INFORMATION

TECHNICAL FIELD

The present disclosure relates generally to software technology, and more particularly, to systems and methods for automatically generating a dependency graph based on input and output requirements of information.

BACKGROUND

A software deployment is the process for deploying, configuring, and updating software applications to help ensure maximum optimization, security, and compatibility within a computing network. A deployment is often scheduled to take place at times considered to be the least intrusive by an organization's network administrator. For major rollouts, this can result in staggered releases to help minimize interruptions to employee productivity and reduce strain upon the computing network, including providing post-deployment support.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 is a flow diagram depicting a method for handling connection pool sizing with heterogeneous concurrency, according to some embodiments.

DETAILED DESCRIPTION

Figure 1:
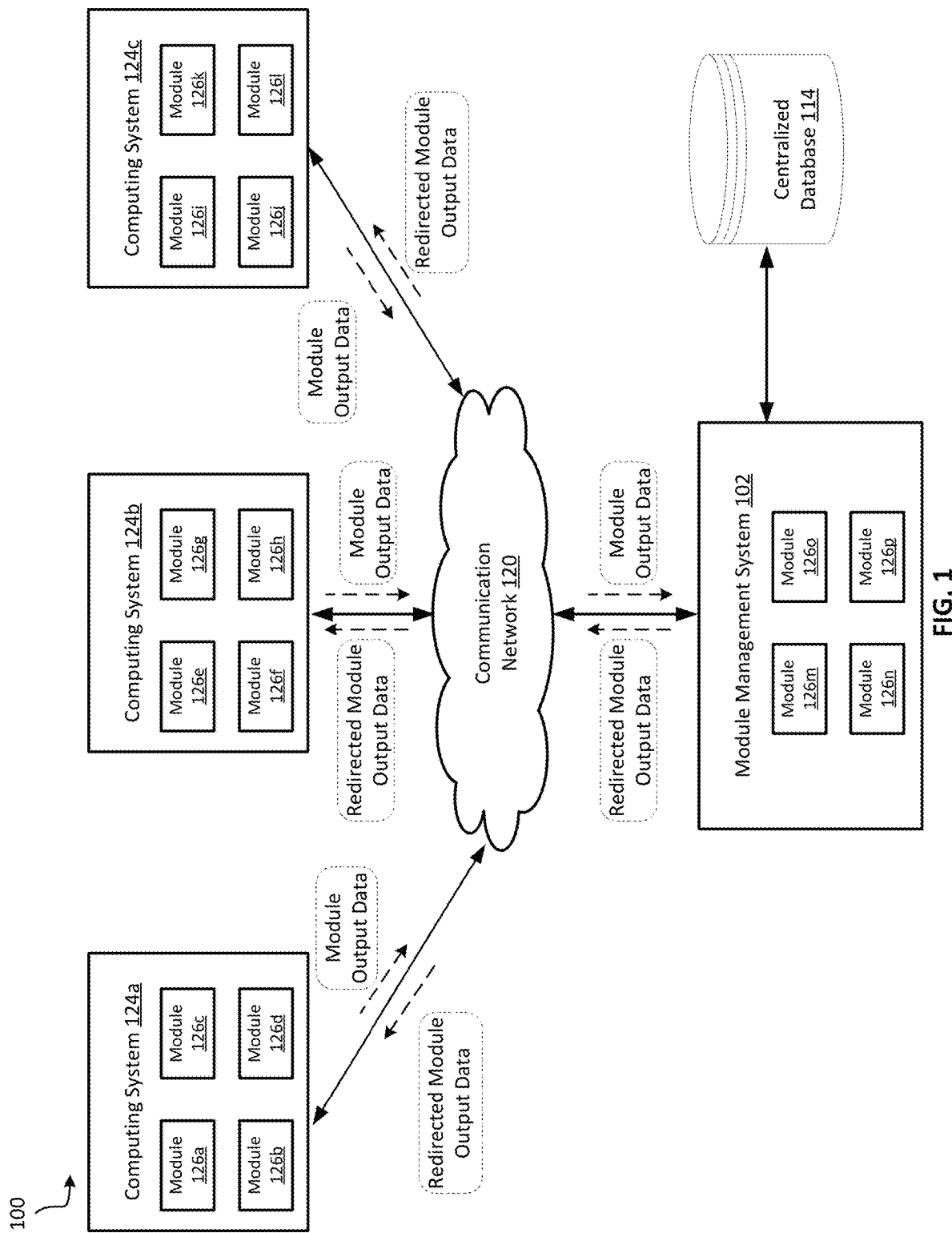
FIG. 1 is a block diagram depicting an example environment for automatically generating a dependency graph based on input and output requirements of information, according to some embodiments.

A software deployment is the process for deploying, configuring, and updating software applications to help ensure maximum optimization, security, and compatibility within a computing network. A deployment is often scheduled to take place at times considered to be the least intrusive by an organization's network administrator. For major rollouts, this can result in staggered releases to help minimize interruptions to employee productivity and reduce strain upon the computing network, including providing post-deployment support.

Software deployments are the entry point for a customer to access an organization's cloud computing service. When a new deployment is required, either due to customer demand, or because of adding a new customer, a manual procedure must be followed to bring the new deployment to life. This manual procedure is often a rigid, pre-defined order of operations that are carried out by various teams of developers, each working together to bring the software deployment online.

However, team collaboration in software deployment often leads to bottlenecks. That is, each team of developers is dependent on the output of the other teams. Therefore, if a first team of developers is delayed in providing their output (e.g., code, instructions, data, etc.) to a second team of developers, then the second team must wait before they can begin developing their portion of the project. This leads to unnecessary delays and inefficiencies in software development and deployment.

Aspects of the present disclosure address the above-noted and other deficiencies by automatically generating a dependency graph (e.g., a workflow) based on input and output requirements of information. As discussed in greater detail below, a module management system may obtain a list of a plurality of modules executing on one or more computing systems, where the plurality of modules may be associated with a plurality of input requirements and a plurality of output requirements. Each module may be configured to generate an output dataset of a respective output requirement of the plurality of output requirements based on an input dataset of a respective input requirement of the plurality of input requirements. The module management system may determine an execution order of the plurality of modules based on the plurality of input requirements and the plurality of output requirements. The module management system may establish a plurality of connections between the plurality of modules based on the execution order. The module management system may receive a first output dataset from a first module of the plurality of modules. The module management system may use one or more of the plurality of connections to redirect the first output dataset to a second module of the plurality of modules to cause the second module to generate a second output dataset based on the first output dataset. Each module may include one or more operations of a process or program, such that the execution of each of the modules according to the execution order causes the modules to execute the operations of the process or program, as a whole.

Thus, the embodiments of the present disclosure determine the type of information that each operation needs in order to do its work, and finds what other operations that could provide the information. It then ensures that the operations are executed in the correct order to satisfy each operation's dependencies and marshals the data going into and out of each operation so that the operation itself does not have to know anything about the providing operation's data format. If any preceding operation's data output changes for any reason, then the embodiments of the present disclosure know to re-evaluate any dependent operation.

Benefits of using the one or more embodiments of the present disclosure for automatically generating a dependency graph (e.g., a workflow) based on input and outputs requirements of information may include a reduction in networking resources needed to execute a process, as well as, a decrease in network congestion and power consumption for the overall network infrastructure.

FIG. 1 is a block diagram depicting an example environment for automatically generating a dependency graph based on input and output requirements of information, according to some embodiments. The environment 100 includes a computing system 124a, a computing system 124b, and a computing system 124c (collectively referred as, computing systems 124). The environment 100 includes modules 126a, 126b, 126c, 126d, 126e, 126f, 126g, 126h, 126i, 126j, 126k, 126l, 126m, 126n, 126o, 126p (collectively referred as, modules 126). The computing system 124a may be configured to execute and/or store one or more of modules 126a, 126b, 126c, 126d; the computing system 124b may be configured to execute and/or store one or more of modules 126e, 126f, 126g, 126h; and the computing system 124c may be configured to execute and/or store one or more of modules 126i, 126j, 126k, 126l.

A computing system 124 may be any suitable type of computing device or machine that has a processing device, for example, server computers (e.g., an application server, a catalog server, a communications server, a computing server, a database server, a file server, a game server, a mail server, a media server, a proxy server, a virtual server, a web server), desktop computers, laptop computers, tablet computers, smartphones, set-top boxes, a graphics processing unit (GPU), etc. In some examples, a computing device may comprise a single machine or may include multiple interconnected machines (e.g., multiple servers configured in a cluster).

In some embodiments, a computing system 124 may be any type of cloud computing platform (e.g., Amazon Web Services, Microsoft Azure, Google Cloud Platform, etc.). In some embodiments, the computing system 124 may be an Infrastructure-as-a-Service (IaaS) that provides users with compute (e.g., processing), networking, and storage resources. In some embodiments, the computing system 124 may be a Platform-as-a-Service (PaaS) that provides users with a platform on which applications can run, as well as the information technology (IT) infrastructure for it to run. In some embodiments, the computing system 124 may be a Software-as-a-Service (SaaS) that provides users with a cloud application, the platform on which it runs, and the platform's underlying infrastructure. In some embodiments, the computing system 124 may be a Function-as-a-Service (FaaS) that is an event-driven execution model that lets the developers build, run, and manage application packages as functions without maintaining the infrastructure.

In some embodiments, a computing system 124 may include a one or more virtual machines (VM) that execute on a hypervisor which executes on top of an operating system (OS) of the computing system 124 to provide a virtual environment. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.).

The environment 100 includes a module management system 102 for managing the order in which the modules 126 are executed and/or directing the communication (e.g., input datasets, output datasets, etc.) between the modules 126. As shown in FIG. 1, the module management system 102 may be configured to execute and/or store one or more of modules 126m, 126n, 126o, 126p. The module management system 102 is communicably coupled to each of the computing systems 124 via a communication network 120. The environment 100 includes a centralized database 114 and/or internal cache memory (not shown in FIG. 1) for storing information associated with the modules 126.

Although FIG. 1 shows only a select number of computing devices (e.g., computing systems 124 and module management system 102), components (e.g., modules 126), and storage devices (e.g., centralized databases 114); the environment 100 may include any number of computing devices, components and/or storage devices that are interconnected in any arrangement to facilitate the exchange of data between the computing devices, components and/or storage devices. Each computing system 124 may execute any number (e.g., 1, 10s, 100s, 1000s, etc.) of modules 126 on its respective processing device.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

A program or a process may include a plurality of operations (e.g., tasks, procedures, instructions). The module management system 102 may be configured to divide the plurality of operations of the program into sets of one or more operations, where each set may be included in a module 126. In other words, the module management system 102 may be configured to divide the operations of a program into one or more modules 126 that are independent and interchangeable, such that each module 126 may contain everything necessary to execute portions of the desired functionality of the program.

A module 126 may include a requires component that stores an input requirement. A module 126 may include a provides component that stores an output requirement. A module 126 may include an execute component that includes the one or more operations of the module 126. The input requirement may be an input dataset (e.g., one or more fragments or segments of information) of a particular type that the module 126 needs to consume (e.g., process) in order to execute the one or more operations of the execute component. The output requirement may be an output dataset of a particular type that the module 126 generates (e.g., computes) based on the input dataset of the particular type. A particular type of an output dataset may correspond to code, an instruction, a data structure, a variable, a constant, a pointer (e.g., a reference to a location in memory), a list, a schema, a table, an object, and the like. In some embodiments, an output dataset may differ from another output dataset in at least one of a data format, a data value, or a data type.

A module 126 may include a confirm component that is configured to verify (e.g., confirm) that the information that it receives from another entity (e.g., another module 126, the module management system 102) conforms to the input requirements of the module 126. For example, a second module (e.g., module 126b) may receive an input dataset from a first module (e.g., module 126a), and in response to receiving the input dataset, confirm whether the input dataset conforms (e.g., is compliant) to the input requirements of the second module. If the input dataset conforms to the input requirements, then the confirm component of the second module may be configured to allow the second module to generate an output dataset based on the input dataset, send the output dataset to another entity, and/or store the output dataset in memory/storage. If the input dataset of the second module does not conform to the input requirements, then the confirm component of the second module may be configured to prevent the second module from generating the output dataset, sending the output dataset to another entity, and/or storing the output dataset in memory/storage.

The confirm component of a module 126 may be configured to verify that the information that it receives from another entity conforms to the input requirements of the module 126 responsive to determining an occurrence of a triggering event. In some embodiments, a triggering event may occur when the module 126 receives information (e.g., an input dataset), when any module 126 in the dependency graph changes state, and/or when there is an elapse of a predetermined amount of time (e.g., seconds, minutes, hours, days, etc.).

In some embodiments, the confirm component of a module 126 may determine that a first dataset from a first module (e.g., module 126*a*) and a second dataset from a second module (e.g., module 126*b*) are each compliant to the input requirements of the module 126 even though the two datasets may be different and/or originated from different modules 126. For example, a third module (e.g., module 126*c*) may receive a table of numbers from a first module (e.g., module 126*a*) and a string of alphanumeric characters from a second module (e.g., module 126*b*). The confirm components of the third module may determine that the table of numbers and the string of alphanumeric characters each conforms to the input requirements of the third module.

In some embodiments, a module 126 may be configured to receive an input dataset and determine whether the module 126 has a capability to generate an output dataset of a particular output requirement based on the input dataset. In some embodiments, a module 126 may be configured to send a message to the module management system 102 indicating the capability of the module 126 to generate the output dataset of the particular output requirement based on the input dataset. In some embodiments, the module management system 102 may be configured to modify an execution order (e.g., a workflow) of a plurality of modules responsive to determining that the message indicates that the module 126 lacks the capability (e.g., computing resources, storage resources, memory resources, etc.) to generate the output dataset of the particular output requirement based on the input dataset. For example, the module management system 102 may be configured to modify an execution order of the plurality of modules by replacing module 126*a* with module 126*b* responsive to determining from the message that the module 126 lacks the processing capability to generate an output dataset.

A child module is a module 126 that has its input connected to the output of another module 126, referred to as a parent module. A child module depends on the parent module because the child module needs the output dataset from the parent module in order to generate its own output dataset. The module management system 102 may be configured to seamlessly replace (e.g., swap, switch) a parent module with a different parent module without the child module ever even knowing that the parent module was replaced. For example, module 126*a* may be the parent module to module 126*b* because there is a connection between the output of module 126*a* and the input of module 126*b*. While in this configuration, the module management system 102 may replace the module 126*a* with module 126*c* by removing the connection from module 126*a* and re-attaching the connection to module 126*c* such that the connection now exists between module 126*a* and module 126*c*; thereby making module 126*c* the parent module to module 126*a*.

The confirm component of a module 126 may be configured to verify (e.g., confirm) the validity of the output dataset by confirming the state of the module 126 or whether the state of the module 126 has changed. For example, if the confirm component of module 126*a* determines that module 126*a* was in an erred state while generating the output dataset or after generating the output dataset, then the confirm component may determine that the output dataset is invalid. If the confirm component of module 126*a* determines that module 126*a* was in an error-free state while generating the output dataset and stayed in the error-free state after generating the output dataset, then the confirm component may be configured to determine that the output dataset is valid.

If the confirm component of a module 126 determines that the module 126 was in an error-free state while generating the output dataset and stayed in the error-free state after generating the output dataset, then the confirm component may be configured to allow the module 126 to generate the output dataset, send the output dataset to another entity (e.g., another module 126, the module management system 102), and/or store the output dataset in memory/storage. If the confirm component of a module 126 determines that the module 126 was in an erred state while generating the output dataset, then the confirm component may be configured to prevent module 126 from generating the output dataset, sending the output dataset to another entity (e.g., another module 126, the module management system 102), and/or storing the output dataset in memory/storage.

If the confirm component of a module 126 determines that the module 126 was in an erred state after generating the output dataset, then the confirm component may be configured to generate a message (e.g., a flag) indicating that the output dataset is invalid and/or that a subset (e.g., one or more) of a plurality of modules 126 associated with a program need to re-generate their output datasets. The confirm component of a module 126 may be configured to send the message to the module management system 102. In response to receiving the message, the module management system 102 may be configured to identify a subset of modules 126 of the plurality of modules 126 whose respective input dataset depends on (or is affected by) the state or change in state of the module 126.

For example, an output of a first module (e.g., module 126*a*) may be coupled to an input of a second module (e.g., module 126*b*), whose output is coupled to an input of a third module (e.g., module 126*c*). In this configuration, the first module 126 may generate a first output dataset and provide the first output dataset to the second module 126 to cause the second module 126 to generate a second output dataset based on the first output dataset and provide the second output dataset to the third module 126. Now, if the module management system 102 determines that the first output dataset is invalid, then the module management system 102 may determine that the second module 126 and the third module 126 need to re-generate their output datasets because they are dependent on the first output dataset.

In some embodiments, a module 126 may be an erred state, an error-free state, an active state, or an inactive state. In some embodiments, a module 126 may be in an erred state if the module 126 is executing incorrectly and/or producing unexpected (e.g., undesired, unpredictable) results. In some embodiments, a module 126 may be in an error-free state if the module 126 is executing correctly and producing expected (e.g., desired, predictable) results. In some embodiments, an active state may be where a module 126 is executing on a processing device of a computing system 124, but not consuming an input dataset and/or generating an output dataset. In some embodiments, an inactive state may be where a module 126 is not executing (e.g., not yet launched) on a processing device of a computing system 124.

The module management system 102 may be configured to send a request to each of the computing systems 124 for a list (e.g., one or more) of module identifiers corresponding to one or more modules 126 that are executing and/or stored on the computing systems 124. In response to receiving the request, each of the computing systems 124 may generate a list of module identifiers corresponding to the one or more modules 126 executing on their respective processors and/or stored in their respective memory/storage systems. For example, computing system 124a may generate a first list of module identifiers corresponding to modules 126a-126d, computing system 124b may generate a second list of module identifiers corresponding to modules 126e-126h, and computing system 124c may generate a third list of module identifiers corresponding to modules 126i-126l. In some embodiments, a computing system 124 may generate a list of module identifiers for the modules 126 that are currently executing on a processing device of the computing system 124 and/or stored on a memory of the computing system 124. In some embodiments, a computing system 124 may generate a list of module identifiers for the modules 126 that are currently executing on a processing device of the computing system 124, but exclude the modules from the list that are currently not executing on the processing device of the computing system 124. Each of the computing systems 124 may send their respective list of module identifiers to the module management system 102. Since each computing system 124 may execute its own set of modules, their respective lists of module identifiers refer to different sets of modules 126.

In some embodiments, a computing system 124 may be configured to send a list of module identifiers to the module management system 102 without having to receive a request from the module management system 102. In some embodiments, a computing system 124 may be configured to send a list of module identifiers to the module management system 102 responsive to determining an occurrence of a triggering event. In some embodiments, a triggering event may be when there is an elapse of a predetermined amount of time (e.g., hours, days, weeks), when a module 126 is executed (e.g., launched), when a module is terminated, and/or when a module 126 in the dependency graph changes state.

In some embodiments, the module management system 102 may be configured to generate a list of module identifiers corresponding to the one or more modules 126 executing on a processor of the module management system 102 and/or stored in a memory/storage system of the module management system 102. For example, the module management system 102 may generate a list of module identifiers corresponding to modules 126m-126p.

The module management system 102 may be configured to aggregate (e.g., combine, collect) each of the lists of module identifiers into a single list of module identifiers. The module management system 102 may be configured to store the list of module identifiers in memory/storage of the module management system 102 to be retrieved by the module management system 102 at a later time. A list of module identifiers may correspond to a plurality of modules 126 associated with a plurality of input requirements and a plurality of output requirements.

Each module 126 of the plurality of modules 126 may be configured to generate an output dataset of a respective output requirement of the plurality of output requirements based on an input dataset of a respective input requirement of the plurality of input requirements. In some embodiments, two or more of the input requirements of the plurality of input requirements may be identical or different. For example, a first module (e.g., module 126a) may include an input requirement indicative of a table of numbers and a second module (e.g., modules 126b) may also include an input requirement indicative of a table of numbers. Alternatively, a first module (e.g., module 126a) may include an input requirement indicative of a table of numbers and a second module (e.g., modules 126b) may include an input requirement indicative of a string of alphanumeric characters.

In some embodiments, two or more of the output requirements of the plurality of output requirements may be identical or different. For example, a first module (e.g., module 126a) may send a set of numbers to a second module (e.g., module 126a) and a third module (e.g., module 126b) to cause the second module to generate a string of alphanumeric characters based on the set of numbers and the third module to generate a string of alphanumeric characters based on the set of numbers. Alternatively, the first module (e.g., module 126a) may send a set of numbers to a second module (e.g., module 126b) and a third module (e.g., module 126c) to cause the second module to generate a string of alphanumeric characters based on the set of numbers and the third module to generate a table of numbers based on the set of numbers.

The module management system 102 may be configured to determine an execution order of the plurality of modules based on the plurality of input requirements and the plurality of output requirements that are associated with the list of module identifiers. An execution order (e.g., a workflow) is the order in which a plurality of modules that are associated with a process or program are executed. To determine the execution order, the module management system 102 may be configured to select a module identifier from the list of module identifiers and determine that the module 126 corresponding to the selected module identifier includes a particular input requirement. The module management system 102 may be configured to scan (e.g., search) the list of module identifiers to determine whether there are other modules 126 (e.g., one or more) that include an output requirement that conforms to the input requirement of the selected module. The module management system 102 may be configured to establish, in response to the determination, a connection between the outputs of each of the other modules 126 (e.g., the ones with conforming output requirements) and the input of the selected module, such that the selected module receives one or more input datasets that conforms to its input requirements.

For example, the module management system 102 may scan the list of module identifiers to determine that a third module (e.g., module 126c) includes an input requirement indicative of a table of numbers. The module management system 102 may scan the list of module identifiers to determine that a first module (e.g., module 126a) includes an output requirement indicative of a table of numbers and a second module (e.g., module 126b) includes an output requirement indicative of a function pointer. In response to the determination, the module management system 102 may establish a connection between the output of the first module 126 and the input of the third module 126, but not establish a connection between the output of the second module 126 and the input of the third module 126.

The module management system 102 may be configured to establish connections between outputs of one or more modules 126 and inputs of one or more modules 126 by maintaining a plurality of mappings (e.g., linkages, associations) between the identifiers of the modules in memory/storage. Each module 126 may be configured to provide its output dataset (shown in FIG. 1 as, "Module Output Data") to the module management system 102. The module management system 102 may be configured to redirect (shown in FIG. 1 as, "Redirected Module Output Data") the output dataset that it receives from each module 126 to the inputs of one or more of the other modules 126 based on the plurality of mappings (sometimes referred to as, plurality of connections). For example, the module management system 102 may update the plurality of mappings to indicate that the output of a first module (e.g., module 126a) is mapped to the input of a second module (e.g., module 126b). If the module management system 102 receives an output dataset from the first module, then the module management system 102 may determine that the plurality of mappings indicate that the output of the first module is mapped to the input of the second module, and in response, redirect the output dataset from the first module to the input of the second module. In some embodiments, an execution order may include (or indicate) a plurality of mappings associated with a plurality of modules.

The module management system 102 may receive a plurality of output datasets from a plurality of modules that are connected (e.g., according to the plurality of mappings) to an input of a single module 126. In this instance, the module management system 102 may be configured to select the output dataset that should be redirected based on the availability of the dataset. For example, the module management system 102 may receive a first output dataset from a first module (e.g., module 126a) during a first timeslot and a second output dataset from a second module (e.g., module 126b) during a second timeslot, where the first timeslot is earlier than the second timeslot. The module management system 102 may determine that both datasets could be redirected to the third module because the plurality of mappings indicate that the output of the first module and the output of the second module are each connected to the input of a third module (e.g., module 126c). In this instance, the module management system 102 implements a tie-breaking approach by selecting the first dataset instead of the second dataset because the first dataset arrived at the module management system 102 before the second dataset. The module management system 102 redirects the first dataset to the input of a third module and without redirecting the second dataset to the input of the third module.

In some embodiments, the module management system 102 may include the same functionality as the confirm component of a module 126. For example, the module management system 102 may be configured to receive an output dataset from a first module (e.g., module 126a) and verify (e.g., confirm) whether the output dataset conforms to the input requirements of a second module (e.g., module 126b). Additionally, the module management system 102 may be configured to receive an output dataset from the first module and verify the validity of the output data by confirming the state of the first module or whether the state of the first module has changed. In some embodiments, the module management system 102 may be configured to simultaneously confirm all modules 126 of an execution order or dependency graph.

In some embodiments, the module management system 102 may be configured to modify (e.g., adjust, change) an execution order of the plurality of modules when the plurality of modules is in a non-executing state or when the plurality of modules is in an executing state (e.g., during runtime). In some embodiments, the module management system 102 may be configured to modify an execution order of the plurality of modules by replacing a module 126 of the plurality of modules 126 with a different module 126. In some embodiments, the module management system 102 may be configured to modify an execution order of the plurality of modules 126 responsive to determining that one or more of the modules 126 of the execution order is in (or changed to) an error-state.

The computing systems 124, the modules 126, and/or the module management system may each include their own interface, but each interface corresponds to a common interface type that uses a standardized protocol for communicating the output datasets. The common interface may allow a first module (e.g., module 126a) to generate and send an output dataset of a particular output requirement to a second module (e.g., module 126b), such that the particular output requirement conforms to the input requirement of the second module.

The common interface may allow the module management system 102 (or a system administrator of the environment 100) to modify a module 126 of an execution order (e.g., workflow) without impacting the performance of any of the other modules 126 of an executive order. For example, an output of a first module (e.g., module 126a) may be connected to an input of a third module (e.g., module 126c). In this configuration, the first module may send a first output dataset of a particular output requirement to the input of the third module, and the third module may confirm that the first output dataset conforms to the input requirement of the third module. The module management system 102 may then replace the first module with a second module (e.g., module 126c), such that the second module may send a second output dataset of the particular output requirement to the input of the third module. The third module may confirm that the second output dataset conforms to the input requirement of the third module even though the first module was replaced with the second module because each of the modules use common interfaces. The common interface may allow a first module (e.g., module 126a) to send an output dataset to a second module (e.g., module 126b), where the second module is unaware that the first module was the module that generated and sent the output dataset.

The module management system 102 may be configured to establish any combination of connections between any of the modules 126 executing on the computing system 124a, any of the modules 126 executing on the computing system 124b, and/or any of the modules 126 executing on the computing system 124c. For example, module management system 102 may establish a connection between the output of module 126a and the input of module 126b, a connection between the output of module 126a and the input of module 126g, and/or a connection between the output of module 126a and the input of module 126j. In some embodiments, the module management system 102 may be configured to establish direct connections between the modules 126, such that the output dataset from a first module 126 may pass to the input of a second module 126 without having to rely on a computing device (e.g., the module management system 102) to receive the output dataset from the first module 126 and redirect the output dataset to the second module 126.

Figure 2:
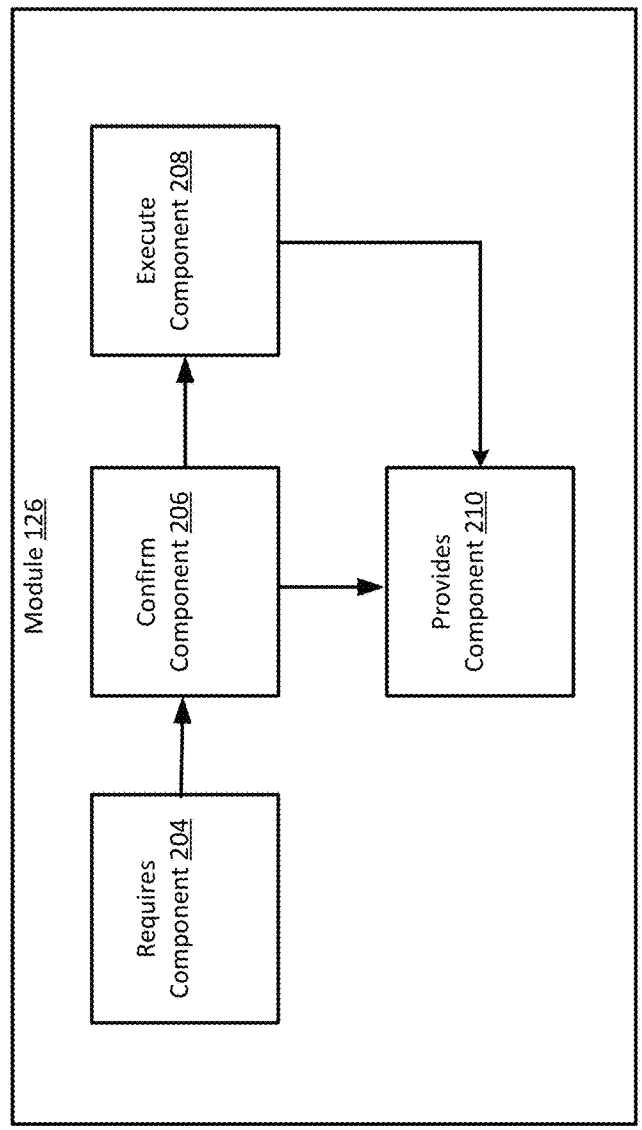
FIG. 2 is a block diagram depicting an example of the module 126 in FIG. 1, according to some embodiments.

FIG. 2 is a block diagram depicting an example of the module 126 in FIG. 1, according to some embodiments. The module 126 may include a requires component 204 that stores an input requirement. The module 126 may include a provides component 210 that stores an output requirement. The module 126 may include an execute component 208 that stores one or more operations of the module 126. The input requirement may be an input dataset (e.g., one or more fragments or segments of information) of a particular type that the module 126 needs to consume in order to execute the one or more operations of the execute component 208. The output requirement may be an output dataset of a particular type that the module 126 generates based on the input dataset of the particular type. A particular type may correspond to code, an instruction, a data structure, a variable, a constant, a pointer (e.g., a reference to a location in memory), a list, a schema, a table, an object, and the like. In some embodiments, an output dataset may differ from another output dataset in at least one of a data format, a data value, or a data type.

The module 126 includes a confirm component 206 that may be configured to verify (e.g., confirm) that the output dataset (e.g., this becomes the input dataset for the module 126) that it receives from another entity (e.g., another module 126, the module management system 102) conforms to the input requirements of the module 126. The confirm component 206 of the module 126 may be configured to verify the validity of the output dataset (e.g., this becomes the input dataset for the module 126) by confirming the state of the module 126 or whether the state of the module 126 has changed. The module 126 may be configured to determine whether to process an input dataset based on whether the input dataset conforms to the input requirements of the module 126.

Figure 3:
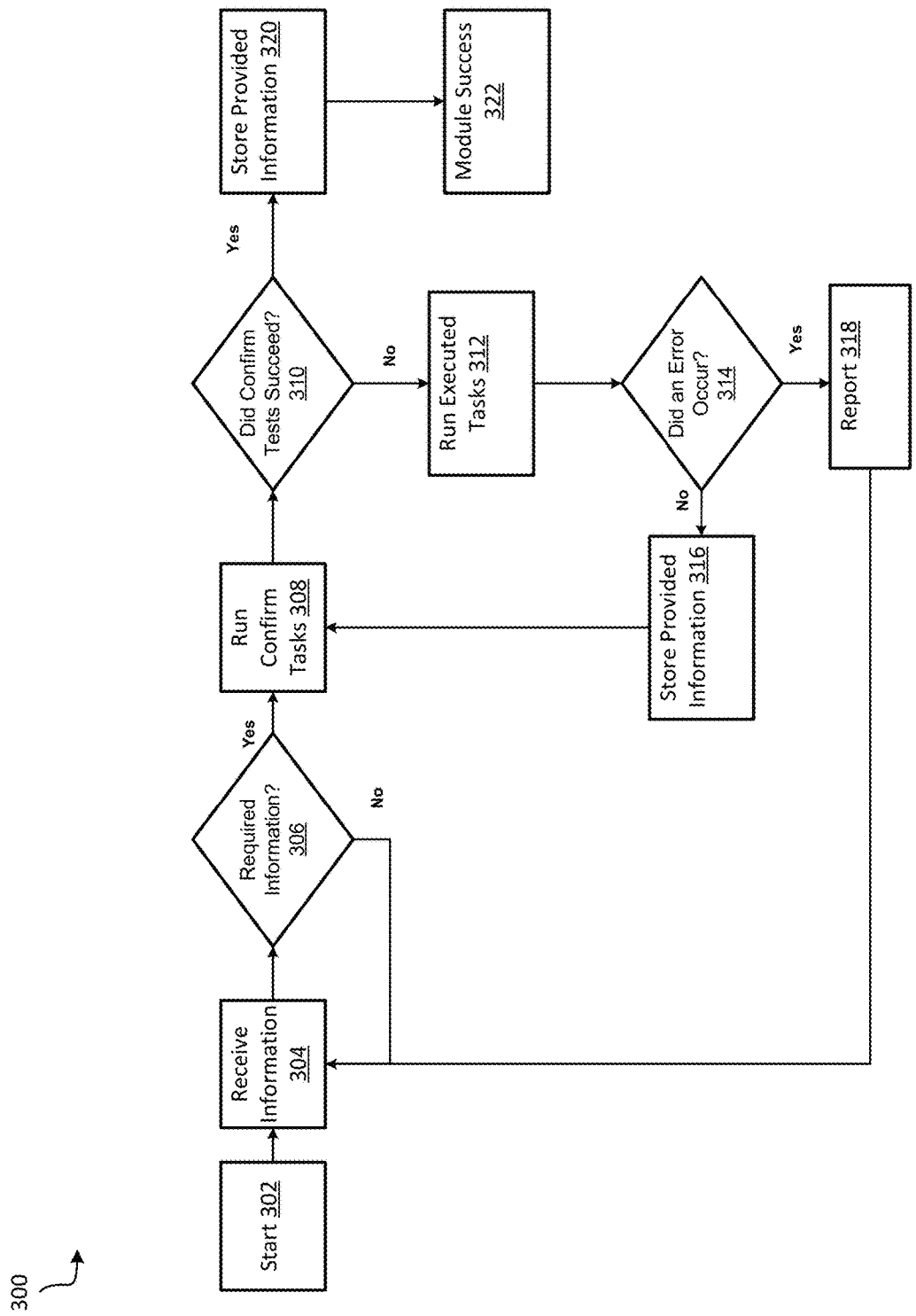
FIG. 3 is a flow diagram depicting a method for confirming a validity of an input dataset, according to some embodiments.

FIG. 3 is a flow diagram depicting a method for confirming a validity of an input dataset, according to some embodiments. The method 300 may be performed by the module 126 in FIG. 1. Although the method 300 is described with respect to the module 126, one or more of the blocks may be performed by the module management system 102 in FIG. 1. The method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of starting, by the module management system 102, a module 126 to cause the module 126 to execute on a processing device of the computing system 124. The method 300 includes the block 304 of receiving, by the module 126, information. The method 300 includes the block 306 of determining, by the module 126, whether the information conforms to the input requirements of the requires component 204. If the module 126 determines that the information conforms to the input requirements of the requires component 204, then the module 126 proceeds to block 306; otherwise the module 126 proceeds to block 304, to repeat block 304.

The method 300 includes the block 308 of running, by the module 126, one or more confirm tests. The method 300 includes the block 310 of determining, by the module 126, whether the confirm tests succeeded (e.g., passed). If the confirm tests succeeded, then the module 126 proceeds to block 320 to store the information in a memory/storage and proceed to block 322 to report that the module is a success. If the confirm tests did not succeed, then the module 126 proceeds to block 312.

The method 300 includes the block 312 of running, by the module 126, executed tasks. The method 300 includes the block 314 of determining whether an error occurred as a result of running the executed tasks. If an error occurred, then the module 126 proceeds to block 318 to report the error and proceed to block 304, to repeat block 304. If an error did not occur, then the module 126 proceeds to block 316 to store the information in a memory/storage and proceed to block 308, to repeat block 308.

Figure 4:
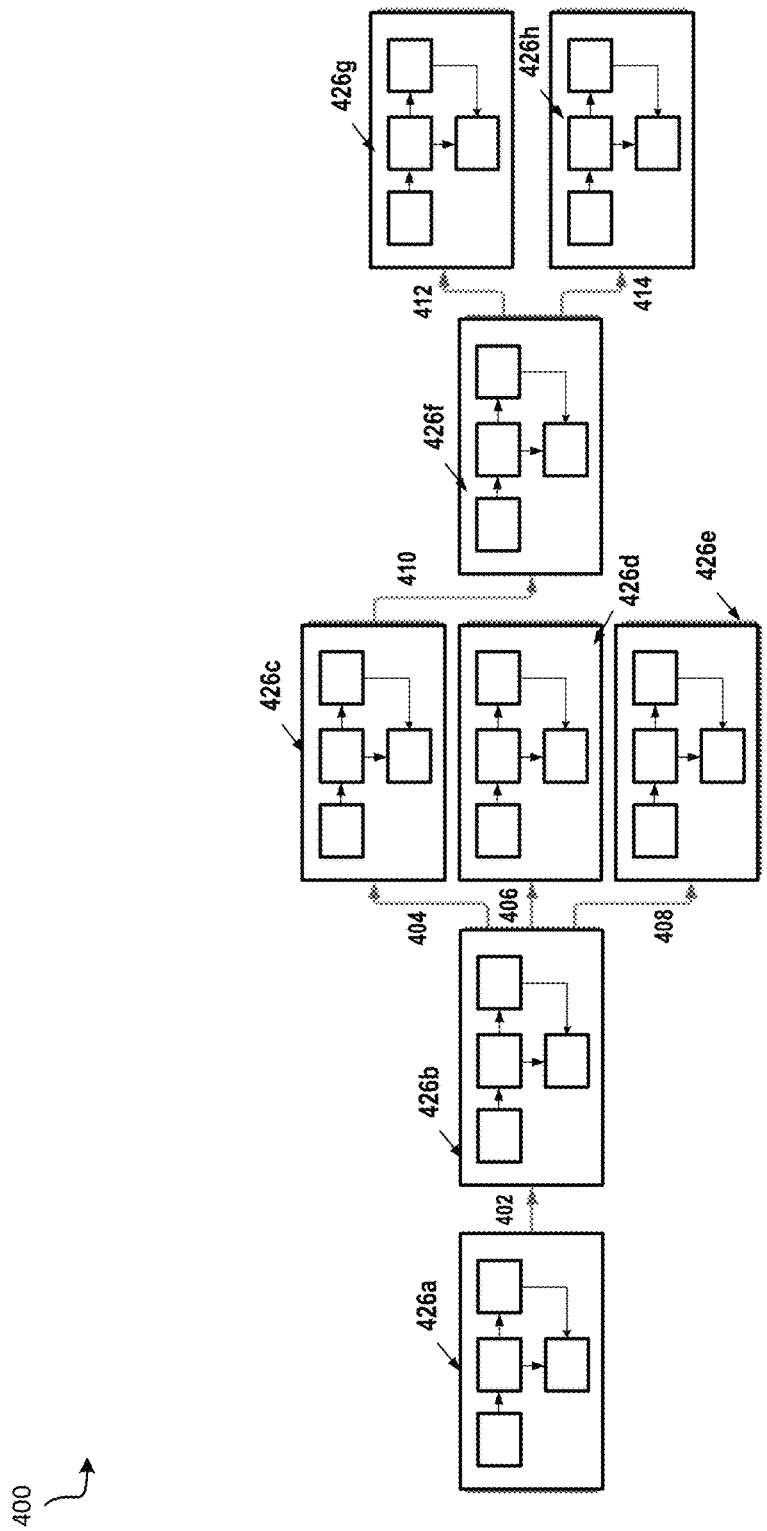
FIG. 4 is a block diagram of a dependency graph of modules, according to some embodiments.

FIG. 4 is a block diagram of a dependency graph (sometimes referred to as, an execution order, a workflow, or a dependency tree) of modules, according to some embodiments. The dependency graph 400 shows the order in which a plurality of modules receive information (e.g., input datasets), execute tasks, and provide information (e.g., output datasets) based on their connections. The graph 400 includes modules 426a, 426b, 426c, 426d, 426e, 426f, 426g, 426h (collectively referred to as, modules 426). In some embodiments, any of the modules 426 may be the module 126 in FIG. 1. The graph 400 includes connection 402, 404, 406, 408, 410, 412, 414 (collectively referred to as, connections 402-414).

As shown, an output of module 426a is coupled to module 426b via connection 402. An output of module 426b is coupled to an input of module 426c via connection 404, an input of module 426d via connection 406, and an input of module 426e via connection 408. An output of module 426c is coupled to an input of module 426f via connection 410. An output of module 426f is coupled to an input of module 426g via connection 412 and an input of module 426h via connection 414.

According to the arrangement of graph 400, the module 426a sends an output dataset to module 426b via connection 402, causing the module 426b to generate an output dataset based on the input dataset. The module 426b sends its output dataset to module 426c via connection 404, causing the module 426c to generate an output dataset based on the input dataset. The module 426b sends its output dataset to module 426d via connection 406, causing the module 426d to generate an output dataset based on the input dataset. The module 426b sends its output dataset to module 426e via connection 408, causing the module 426e to generate an output dataset based on the input dataset. The module 426c sends its output dataset to module 426f via connection 410, causing module 426f to generate an output dataset based on the input dataset. The module 426f sends its output dataset to module 426g via connection 412, causing module 426g to generate an output dataset based on the input dataset. The module 426f sends its output dataset to module 426h via connection 414, causing module 426h to generate an output dataset based on the input dataset.

In some embodiments, each of the connections 402-414 shown in FIG. 4 may be a direct connection between an output of a first module 426 and an input of a second module 426, such that the output dataset from a first module 426 passes to the input of second module 426 without having to rely on a computing device (e.g., the module management system 102) to receive the output dataset from the first module 426 and redirect the output dataset to the second module 426.

In some embodiments, each of the connections 402-414 shown in FIG. 4 may be an indirect connection between an output of a first module 426 and an input of a second module 426, such that the output dataset from a first module 426 passes to the input of second module 426 because a computing device (e.g., the module management system 102) must receive the output dataset from the first module 426 and redirect the output dataset to the second module 426. In some embodiments, the module management system 102 redirects the output data from a first module 426 to an input of the second module 426 based on an execution order or a plurality of mappings associated with modules 426. In some embodiments, the module management system 102 determines the execution order or the plurality of mappings for the modules 426 based on the plurality of input requirements associated with modules 426 and/or the plurality of output requirements associated with modules 426.

Figure 5B:
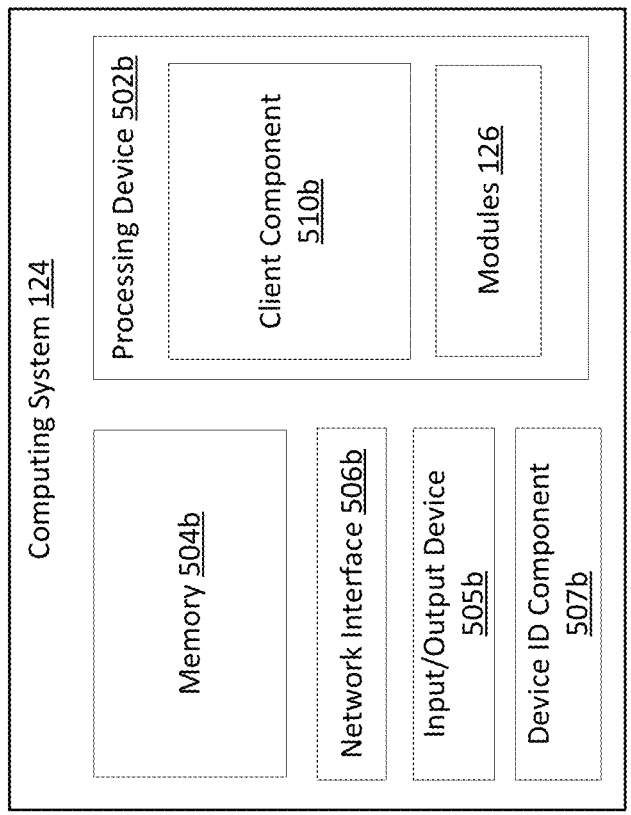
FIG. 5B is a block diagram depicting an example of the computing system 124 of the environment in FIG. 1, according to some embodiments.
Figure 5A:
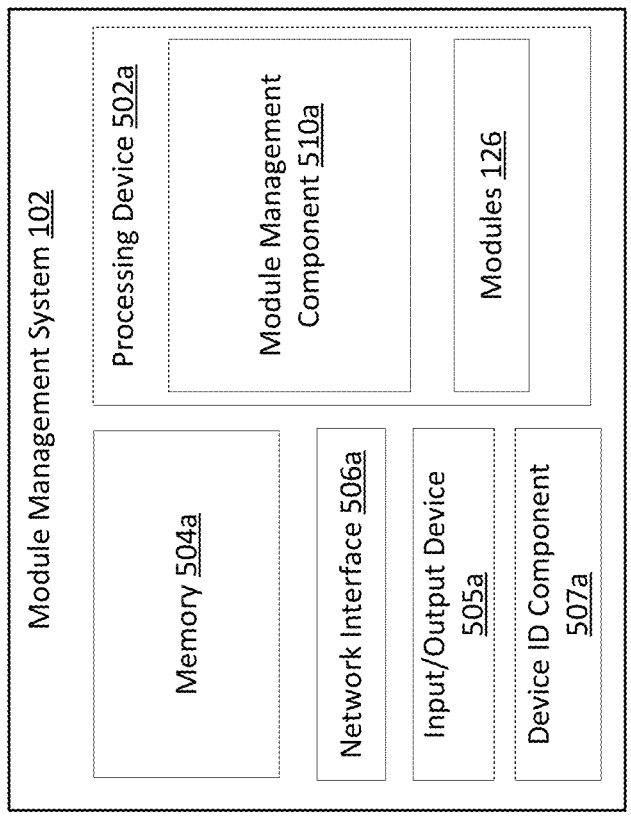
FIG. 5A is a block diagram depicting an example of the module management system 102 in FIG. 1, according to some embodiments.

FIG. 5A is a block diagram depicting an example of the module management system 102 in FIG. 1, according to some embodiments. While various devices, interfaces, and logic with particular functionality are shown, it should be understood that the module management system 102 includes any number of devices and/or components, interfaces, and logic for facilitating the functions described herein. For example, the activities of multiple devices may be combined as a single device and implemented on a same processing device (e.g., processing device 502a), as additional devices and/or components with additional functionality are included.

The module management system 102 includes a processing device 502a (e.g., general purpose processor, a PLD, etc.), which may be composed of one or more processors, and a memory 504a (e.g., synchronous dynamic random access memory (DRAM), read-only memory (ROM)), which may communicate with each other via a bus (not shown).

The processing device 502a may be provided by one or more general-purpose processing devices such as a microprocessor, central processing unit, or the like. In some embodiments, processing device 502a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 502a may comprise one or more special-purpose processing devices such as an application specific integrated circuit (ASIC), a field programmable gate array (FPGA), a digital signal processor (DSP), network processor, or the like. The processing device 502a may be configured to execute the operations described herein, in accordance with one or more aspects of the present disclosure, for performing the operations and steps discussed herein.

The memory 504a (e.g., Random Access Memory (RAM), Read-Only Memory (ROM), Non-volatile RAM (NVRAM), Flash Memory, hard disk storage, optical media, etc.) of processing device 502a stores data and/or computer instructions/code for facilitating at least some of the various processes described herein. The memory 504a includes tangible, non-transient volatile memory, or non-volatile memory. The memory 504a stores programming logic (e.g., instructions/code) that, when executed by the processing device 502a, controls the operations of the module management system 102. In some embodiments, the processing device 502a and the memory 504a form various processing devices and/or circuits described with respect to module management system 102. The instructions include code from any suitable computer programming language such as, but not limited to, C, C++, C#, Java, JavaScript, VBScript, Perl, HTML, XML, Python, TCL, and Basic.

The processing device 502a may execute a module management component 510a. In some embodiments, the module management component 510a may be configured to obtain a list of a plurality of modules 126 executing on one or more computing systems 124. In some embodiments, the plurality of modules 126 may be associated with a plurality of input requirements and a plurality of output requirements. In some embodiments, each module 126 may be configured to generate an output dataset of a respective output requirement of the plurality of output requirements based on an input dataset of a respective input requirement of the plurality of input requirements.

In some embodiments, the module management component 510a may be configured to determine an execution order of the plurality of modules 126 based on the plurality of input requirements and the plurality of output requirements. In some embodiments, the module management component 510a may be configured to establish a plurality of connections between the plurality of modules 126 based on the execution order.

In some embodiments, the module management component 510a may be configured to receive a first output dataset from a first module 126 of the plurality of modules 126. In some embodiments, the module management component 510a may be configured to redirect, based on the execution order, the first output dataset to a second module 126 of the plurality of modules 126 to cause the second module 126 to generate a second output dataset based on the first output dataset.

In some embodiments, the module management component 510a may be configured to receive the second output dataset from the second module 126 of the plurality of modules 126. In some embodiments, the module management component 510a may be configured to redirect, based on the execution order, the second output dataset to a third module 126 of the plurality of modules to cause the third module 126 to generate a third output dataset based on the second output dataset. In some embodiments, the module management component 510a may be configured to redirect, based on the execution order, the second output dataset to a fourth module 126 of the plurality of modules 126 to cause the fourth module 126 to generate a fourth output dataset based on the second output dataset.

In some embodiments, a first connection of the plurality of connections is between a first module 126 of the plurality of modules and a third module 126 of the plurality of modules 126. In some embodiments, a second connection of the plurality of connections is between a second module 126 of the plurality of modules 126 and the third module 126 of the plurality of modules 126. In some embodiments, the module management component 510a may be configured to determine that a first output dataset that is generated by the first module 126 is available before a second output dataset that is generated by the second module 126.

In some embodiments, the module management component 510a may be configured to redirect, responsive to determining that the first output dataset is available before the second output dataset, the first output dataset to the third module 126 of the plurality of modules 126 without redirecting the second output dataset to the third module 126 of the plurality of modules 126.

In some embodiments, the first module 126 was in a first state when generating the first output dataset. In some embodiments, the second module 126 was in a second state when generating the second output dataset. In some embodiments, the module management component 510*a* may be configured to determine that the first module 126 generated the first output dataset while in an error state. In some embodiments, the module management component 510*a* may be configured to determine, responsive to determining that the first module 126 generated the first output dataset while in an error state, that the second module 126 generated the second output dataset while in an error-free state. In some embodiments, the module management component 510*a* may be configured to redirect, responsive to determining that the second module 126 generated the second output dataset while in an error-free state, the second output dataset to the third module 126 of the plurality of modules 126 without redirecting the first output dataset to the third module 126 of the plurality of modules 126.

In some embodiments, the module management component 510*a* may be configured to determine a change in a first module 126 of the plurality of modules 126 from an error-free state to an error state. In some embodiments, the module management component 510*a* may be configured to identify a subset of modules 126 of the plurality of modules 126 whose respective input dataset depends on the change. In some embodiments, the module management component 510*a* may be configured to cause each of the subset of modules 126 to re-generate the output dataset of the respective output requirement of the plurality of output requirements based on the input dataset of the respective input requirement of the plurality of input requirements.

In some embodiments, the change in the first module 126 of the plurality of modules 126 from the error-free state to the error state occurs after the first module 126 of the plurality of modules 126 generates the output dataset of the respective output requirement of the plurality of output requirements based on the input dataset of the respective input requirement of the plurality of input requirements.

In some embodiments, the module management component 510*a* may be configured to determine, by the first module 126 of the plurality of modules 126, that a state of the first module 126 changed during or after the generation of the first output dataset. In some embodiments, the module management component 510*a* may be configured to generate, by the first module 126, a flag indicating an invalidity of the first output dataset or a requirement for a subset of modules 126 to re-generate a plurality of output datasets.

In some embodiments, the module management component 510*a* may be configured to replace a first module 126 of the plurality of modules 126 with a third module 126 of the plurality of modules 126. In some embodiments, the module management component 510*a* may be configured to receive a third output dataset from the third module 126 of the plurality of modules 126. In some embodiments, the module management component 510*a* may be configured to determine a compliance of the second output dataset to the input requirements of the second module 126 of the plurality of modules 126. In some embodiments, the module management component 510*a* may be configured to redirect, responsive to determining the compliance of the second output dataset to the input requirements of the second module 126, the third output dataset to the second module 126 of the plurality of modules 126.

In some embodiments, the first module 126 sends the first output dataset to the processing device using a first interface of the first module 126, and the third module 126 sends the third output dataset to the processing device using a second interface. In some embodiments, the first interface and the second interface correspond to a common interface type. In some embodiments, the second output dataset is different from the first output dataset in at least one of a data format, a data value, or a data type. In some embodiments, the second module 126 is unaware that the first module 126 of the plurality of modules 126 generated the first output dataset. In some embodiments, the module management component 510*a* may be configured to determine a capability to generate the output dataset of a respective output requirement of the plurality of output requirements based on the input dataset of a respective input requirement of the plurality of input requirements, and send a message to the processing device indicative of the capability.

In some embodiments, the processing device 502*a* may execute one or more modules 126 in FIG. 1.

The module management system 102 includes a network interface 506*a* configured to establish a communication session with a computing device for sending and receiving data over the communication network 120 to the computing device. Accordingly, the network interface 506A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the module management system 102 includes a plurality of network interfaces 506*a* of different types, allowing for connections to a variety of networks, such as local area networks (public or private) or wide area networks including the Internet, via different sub-networks.

The module management system 102 includes an input/output device 505*a* configured to receive user input from and provide information to a user. In this regard, the input/output device 505*a* is structured to exchange data, communications, instructions, etc. with an input/output component of the module management system 102. Accordingly, input/output device 505*a* may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the module management system 102, such as a built-in display, touch screen, microphone, etc., or external to the housing of the module management system 102, such as a monitor connected to the module management system 102, a speaker connected to the module management system 102, etc., according to various embodiments. In some embodiments, the module management system 102 includes communication circuitry for facilitating the exchange of data, values, messages, and the like between the input/output device 505*a* and the components of the module management system 102. In some embodiments, the input/output device 505*a* includes machine-readable media for facilitating the exchange of information between the input/output device 505*a* and the components of the module management system 102. In still another embodiment, the input/output device 505*a* includes any combination of hardware components (e.g., a touchscreen), communication circuitry, and machine-readable media.

The module management system 102 includes a device identification component 507a (shown in FIG. 5A as device ID component 507a) configured to generate and/or manage a device identifier associated with the module management system 102. The device identifier may include any type and form of identification used to distinguish the module management system 102 from other computing devices. In some embodiments, to preserve privacy, the device identifier may be cryptographically generated, encrypted, or otherwise obfuscated by any device and/or component of module management system 102. In some embodiments, the module management system 102 may include the device identifier in any communication (e.g., establish connection request, resource request) that the module management system 102 sends to a computing device.

The module management system 102 includes a bus (not shown in FIG. 5A), such as an address/data bus or other communication mechanism for communicating information, which interconnects the devices and/or components of module management system 102, such as processing device 502a, network interface 506a, input/output device 505a, device ID component 507a, module management component 510a, and modules 126.

In some embodiments, some or all of the devices and/or components of module management system 102 may be implemented with the processing device 502a. For example, the module management system 102 may be implemented as a software application stored within the memory 504a and executed by the processing device 502a. Accordingly, such embodiment can be implemented with minimal or no additional hardware costs. In some embodiments, any of these above-recited devices and/or components rely on dedicated hardware specifically configured for performing operations of the devices and/or components.

FIG. 5B is a block diagram depicting an example of the computing system 124 of the environment in FIG. 1, according to some embodiments. While various devices, interfaces, and logic with particular functionality are shown, it should be understood that the computing system 124 includes any number of devices and/or components, interfaces, and logic for facilitating the functions described herein. For example, the activities of multiple devices may be combined as a single device and implemented on a same processing device (e.g., processing device 502b), as additional devices and/or components with additional functionality are included.

The computing system 124 includes a processing device 502b (e.g., general purpose processor, a PLD, etc.), which may be composed of one or more processors, and a memory 504b (e.g., synchronous dynamic random access memory (DRAM), read-only memory (ROM)), which may communicate with each other via a bus (not shown). The processing device 502b includes identical or nearly identical functionality as processing device 502a in FIG. 5a, but with respect to devices and/or components of the computing system 124 instead of devices and/or components of the module management system 102.

The memory 504b of processing device 502b stores data and/or computer instructions/code for facilitating at least some of the various processes described herein. The memory 504b includes identical or nearly identical functionality as memory 504a in FIG. 5A, but with respect to devices and/or components of the computing system 124 instead of devices and/or components of the module management system 102.

The processing device 502b may execute a client component 510b that may be configured to launch a module 126 to cause the module 126 to execute on the processing device 502b. In some embodiments, the client component 510b may be configured to receive a request from the module management system 102 for a list of module identifiers corresponding to one or more modules 126 that are executing and/or stored on the computing systems 124. In some embodiments, the client component 510b may be configured to generate the list of module identifiers and send the list to the module management system 102.

The processing device 502b may execute one or more modules 126 that may be configured to receive an output dataset from another entity (e.g., another module 126, the module management system 102). In some embodiments, the module 126 may be configured to generate an output dataset of an output requirement based on an input dataset of an input requirement. In some embodiments, the module 126 may be configured to send the output dataset to another entity (e.g., another module 126, the module management system 102).

In some embodiments, the module 126 may be configured to verify that the information that the module 126 receives from another entity (e.g., another module 126, the module management system 102) conforms to the input requirements of the module 126. In some embodiments, the module 126 may be configured to verify the validity of an output dataset by confirming the state of a module 126 or whether the state of a module 126 has changed. In some embodiments, the module 126 may be configured to receive an input dataset and determine whether the module 126 has a capability to generate an output dataset of a particular output requirement based on the input dataset.

The computing system 124 includes a network interface 506b configured to establish a communication session with a computing device for sending and receiving data over a network to the computing device. Accordingly, the network interface 506b includes identical or nearly identical functionality as network interface 506a in FIG. 2A, but with respect to devices and/or components of the computing system 124 instead of devices and/or components of the module management system 102.

The computing system 124 includes an input/output device 505b configured to receive user input from and provide information to a user. In this regard, the input/output device 505b is structured to exchange data, communications, instructions, etc. with an input/output component of the remote server 108. The input/output device 505b includes identical or nearly identical functionality as input/output device 505a in FIG. 5A, but with respect to devices and/or components of the computing system 124 instead of devices and/or components of the module management system 102.

The computing system 124 includes a device identification component 507b (shown in FIG. 5B as device ID component 507b) configured to generate and/or manage a device identifier associated with the computing system 124. The device ID component 507b includes identical or nearly identical functionality as device ID component 507a in FIG. 5A, but with respect to devices and/or components of the computing system 124 instead of devices and/or components of the module management system 102.

The computing system 124 includes a bus (not shown), such as an address/data bus or other communication mechanism for communicating information, which interconnects the devices and/or components of the computing system 124, such as processing device 502b, network interface 506b, input/output device 505b, device ID component 507b, the client component 510b, and the modules 126.

In some embodiments, some or all of the devices and/or components of computing system 124 may be implemented with the processing device 502b. For example, the computing system 124 may be implemented as a software application stored within the memory 504b and executed by the processing device 502b. Accordingly, such embodiment can be implemented with minimal or no additional hardware costs. In some embodiments, any of these above-recited devices and/or components rely on dedicated hardware specifically configured for performing operations of the devices and/or components.

FIG. 6 is a flow diagram depicting a method for handling connection pool sizing with heterogeneous concurrency, according to some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 600 may be performed by a module management system, such as module management system 102 in FIG. 1. In some embodiments, method 600 may be performed by a computing system, such as computing system 124 in FIG. 1. In some embodiments, method 600 may be performed by a module 126 executing on the computing system 124.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

As shown in FIG. 6, the method 600 includes the block 602 of obtaining, by a processing device, a list of a plurality of modules executing on one or more computing systems, the plurality of modules associated with a plurality of input requirements and a plurality of output requirements, each module is configured to generate an output dataset of a respective output requirement of the plurality of output requirements based on an input dataset of a respective input requirement of the plurality of input requirements. The method 600 includes the block 604 of determining, by the processing device, an execution order of the plurality of modules based on the plurality of input requirements and the plurality of output requirements. The method 600 includes the block 606 of establishing, by the processing device, a plurality of connections between the plurality of modules based on the execution order.

EXAMPLES

The following examples pertain to further embodiments.

Example 1 is a method. The method includes obtaining, by a processing device, a list of a plurality of modules executing on one or more processing devices, the plurality of modules associated with a plurality of input requirements and a plurality of output requirements, each module is configured to generate an output dataset of a respective output requirement of the plurality of output requirements based on an input dataset of a respective input requirement of the plurality of input requirements. The method includes determining, by the processing device, an execution order of the plurality of modules based on the plurality of input requirements and the plurality of output requirements. The method includes establishing, by the processing device, a plurality of connections between the plurality of modules based on the execution order.

Example 2 is a method as in Example 1, further comprising receiving, by the processing device, a first output dataset from a first module of the plurality of modules; and redirecting, by the processing device based on the execution order, the first output dataset to a second module of the plurality of modules to cause the second module to generate a second output dataset based on the first output dataset.

Example 3 is a method as in any of Examples 1-2, further comprising receiving, by the processing device, the second output dataset from the second module of the plurality of modules; redirecting, by the processing device based on the execution order, the second output dataset to a third module of the plurality of modules to cause the third module to generate a third output dataset based on the second output dataset; and redirecting, by the processing device based on the execution order, the second output dataset to a fourth module of the plurality of modules to cause the fourth module to generate a fourth output dataset based on the second output dataset.

Example 4 is a method as in any of Examples 1-3, wherein a first connection of the plurality of connections is between a first module of the plurality of modules and a third module of the plurality of modules, wherein a second connection of the plurality of connections is between a second module of the plurality of modules and the third module of the plurality of modules, and further comprising determining, by the processing device, that a first output dataset that is generated by the first module is available before a second output dataset that is generated by the second module.

Example 5 is a method as in any of Examples 1-4, further comprising redirecting, by the processing device responsive to determining that the first output dataset is available before the second output dataset, the first output dataset to the third module of the plurality of modules without redirecting the second output dataset to the third module of the plurality of modules.

Example 6 is a method as in any of Examples 1-5, wherein the first module was in a first state when generating the first output dataset, and wherein the second module was in a second state when generating the second output dataset, and further comprising determining, by the processing device, that the first module generated the first output dataset while in an error state; determining, by the processing device responsive to determining that the first module generated the first output dataset while in an error state, that the second module generated the second output dataset while in an error-free state; and redirecting, by the processing device responsive to determining that the second module generated the second output dataset while in an error-free state, the second output dataset to the third module of the plurality of modules without redirecting the first output dataset to the third module of the plurality of modules.

Example 7 is a method as in any of Examples 1-6, further comprising determining, by the processing device, a change in a first module of the plurality of modules from an error-free state to an error state; identifying, by the processing device, a subset of modules of the plurality of modules whose respective input dataset depends on the change; and causing each of the subset of modules to re-generate the output dataset of the respective output requirement of the plurality of output requirements based on the input dataset of the respective input requirement of the plurality of input requirements.

Example 8 is a method as in any of Examples 1-7, wherein the change in the first module of the plurality of modules from the error-free state to the error state occurs after the first module of the plurality of modules generates the output dataset of the respective output requirement of the plurality of output requirements based on the input dataset of the respective input requirement of the plurality of input requirements.

Example 9 is a method as in any of Examples 1-8, further comprising determining, by the first module of the plurality of modules, that a state of the first module changed during or after the generation of the first output dataset; and generating, by the first module, a flag indicating an invalidity of the first output dataset or a requirement for a subset of modules to re-generate a plurality of output datasets.

Example 10 is a method as in any of Examples 1-9, further comprising replacing, by the processing device, a first module of the plurality of modules with a third module of the plurality of modules; receiving, by the processing device, a third output dataset from the third module of the plurality of modules; determining, by the processing device, a compliance of the third output dataset to the input requirements of the second module of the plurality of modules; and redirecting, by the processing device responsive to determining the compliance of the second output dataset to the input requirements of the second module, the third output dataset to the second module of the plurality of modules.

Example 11 is a method as in any of Examples 1-10, wherein the first module sends the first output dataset to the processing device using a first interface of the first module, and the third module sends the third output dataset to the processing device using a second interface, and wherein the first interface and the second interface correspond to a common interface type.

Example 12 is a method as in any of Examples 1-11, wherein the second output dataset is different from the first output dataset in at least one of a data format, a data value, or a data type.

Example 13 is a method as in any of Examples 1-12, wherein the second module is unaware that the first module of the plurality of modules generated the first output dataset.

Example 14 is a method as in any of Examples 1-13, wherein each module is configured to determine a capability to generate the output dataset of a respective output requirement of the plurality of output requirements based on the input dataset of a respective input requirement of the plurality of input requirements.

Example 15 is a method as in any of Examples 1-14, wherein each module is configured to send a message to the processing device that is indicative of the capability.

Example 16 is a system. The system includes a memory; and a processing device, operatively coupled to the memory, to obtain a list of a plurality of modules executing on one or more processing devices, the plurality of modules associated with a plurality of input requirements and a plurality of output requirements, each module is configured to generate an output dataset of a respective output requirement of the plurality of output requirements based on an input dataset of a respective input requirement of the plurality of input requirements. The processing device is further to determine an execution order of the plurality of modules based on the plurality of input requirements and the plurality of output requirements. The processing device is further to establish a plurality of connections between the plurality of modules based on the execution order.

Example 17 is a system as in Example 16, wherein the processing device is further to: receive a first output dataset from a first module of the plurality of modules; and redirect, based on the execution order, the first output dataset to a second module of the plurality of modules to cause the second module to generate a second output dataset based on the first output dataset.

Example 18 is a system as in any of Examples 16-17, wherein the processing device is further to receive the second output dataset from the second module of the plurality of modules; redirect, based on the execution order, the second output dataset to a third module of the plurality of modules to cause the third module to generate a third output dataset based on the second output dataset; and redirect, based on the execution order, the second output dataset to a fourth module of the plurality of modules to cause the fourth module to generate a fourth output dataset based on the second output dataset.

Example 19 is a system as in any of Examples 16-18, wherein a first connection of the plurality of connections is between a first module of the plurality of modules and a third module of the plurality of modules, wherein a second connection of the plurality of connections is between a second module of the plurality of modules and the third module of the plurality of modules, and wherein the processing device is further to determine that a first output dataset that is generated by the first module is available before a second output dataset that is generated by the second module.

Example 20 is a system as in any of Examples 16-19, wherein the processing device is further to redirect, responsive to determining that the first output dataset is available before the second output dataset, the first output dataset to the third module of the plurality of modules without redirecting the second output dataset to the third module of the plurality of modules.

Example 21 is a system as in any of Examples 16-20, wherein the first module was in a first state when generating the first output dataset, and wherein the second module was in a second state when generating the second output dataset, and wherein the processing device is further to determine that the first module generated the first output dataset while in an error state; determine, responsive to determining that the first module generated the first output dataset while in an error state, that the second module generated the second output dataset while in an error-free state; and redirect, responsive to determining that the second module generated the second output dataset while in an error-free state, the second output dataset to the third module of the plurality of modules without redirecting the first output dataset to the third module of the plurality of modules.

Example 22 is a system as in any of Examples 16-21, wherein the processing device is further to determine a change in a first module of the plurality of modules from an error-free state to an error state; identify a subset of modules of the plurality of modules whose respective input dataset depends on the change; and cause each of the subset of modules to re-generate the output dataset of the respective output requirement of the plurality of output requirements based on the input dataset of the respective input requirement of the plurality of input requirements.

Example 23 is a system as in any of Examples 16-22, wherein the change in the first module of the plurality of modules from the error-free state to the error state occurs after the first module of the plurality of modules generates the output dataset of the respective output requirement of the plurality of output requirements based on the input dataset of the respective input requirement of the plurality of input requirements.

Example 24 is a system as in any of Examples 16-23, wherein the processing device is further to determine, by the first module of the plurality of modules, that a state of the first module changed during or after the generation of the first output dataset; and generate, by the first module, a flag indicating an invalidity of the first output dataset or a requirement for a subset of modules to re-generate a plurality of output datasets.

Example 25 is a system as in any of Examples 16-24, wherein the processing device is further to replace a first module of the plurality of modules with a third module of the plurality of modules; receive a third output dataset from the third module of the plurality of modules; determine a compliance of the third output dataset to the input requirements of the second module of the plurality of modules; and redirect, responsive to determining the compliance of the second output dataset to the input requirements of the second module, the third output dataset to the second module of the plurality of modules.

Example 26 is a system as in any of Examples 16-25, wherein the first module sends the first output dataset to the processing device using a first interface of the first module, and the third module sends the third output dataset to the processing device using a second interface, and wherein the first interface and the second interface correspond to a common interface type.

Example 27 is a system as in any of Examples 16-26, wherein the second output dataset is different from the first output dataset in at least one of a data format, a data value, or a data type.

Example 28 is a system as in any of Examples 16-27, wherein the second module is unaware that the first module of the plurality of modules generated the first output dataset.

Example 29 is a system as in any of Examples 16-28, wherein each module is configured to determine a capability to generate the output dataset of a respective output requirement of the plurality of output requirements based on the input dataset of a respective input requirement of the plurality of input requirements, and send a message to the processing device that is indicative of the capability.

Example 30 is a non-transitory computer-readable medium storing instructions that, when execute by a processing device, cause the processing device to obtain, by a processing device, a list of a plurality of modules executing on one or more processing devices, the plurality of modules associated with a plurality of input requirements and a plurality of output requirements, each module is configured to generate an output dataset of a respective output requirement of the plurality of output requirements based on an input dataset of a respective input requirement of the plurality of input requirements; determine an execution order of the plurality of modules based on the plurality of input requirements and the plurality of output requirements; and establish a plurality of connections between the plurality of modules based on the execution order.

Unless specifically stated otherwise, terms such as "obtaining," "determining," "establishing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the embodiments of the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments of the present disclosure are not to be limited to the details given herein, but may be modified within the scope and equivalents of the appended claims.

What is claimed is:

1. A method comprising:
   obtaining, by a processing device, a list of a plurality of modules executing on one or more processing devices, the plurality of modules associated with a plurality of input requirements and a plurality of output requirements, each module is configured to generate an output dataset of a respective output requirement of the plurality of output requirements based on an input dataset of a respective input requirement of the plurality of input requirements;
   determining, by the processing device, an execution order of the plurality of modules based on the plurality of input requirements and the plurality of output requirements; and
   establishing, by the processing device, a plurality of connections between the plurality of modules based on the execution order.

2. The method of claim 1, further comprising:
   receiving, by the processing device, a first output dataset from a first module of the plurality of modules; and
   redirecting, by the processing device using one or more of the plurality of connections, the first output dataset to a second module of the plurality of modules to cause the second module to generate a second output dataset based on the first output dataset.

3. The method of claim 1, further comprising:
   receiving, by the processing device, the second output dataset from the second module of the plurality of modules;
   redirecting, by the processing device using one or more of the plurality of connections, the second output dataset to a third module of the plurality of modules to cause the third module to generate a third output dataset based on the second output dataset; and
   redirecting, by the processing device using one or more of the plurality of connections, the second output dataset to a fourth module of the plurality of modules to cause the fourth module to generate a fourth output dataset based on the second output dataset.

4. The method of claim 1, wherein a first connection of the plurality of connections is between a first module of the plurality of modules and a third module of the plurality of modules, wherein a second connection of the plurality of connections is between a second module of the plurality of modules and the third module of the plurality of modules, and further comprising:
   determining, by the processing device, that a first output dataset that is generated by the first module is available before a second output dataset that is generated by the second module.

5. The method of claim 4, further comprising:
   redirecting, by the processing device responsive to determining that the first output dataset is available before the second output dataset, the first output dataset to the third module of the plurality of modules without redirecting the second output dataset to the third module of the plurality of modules.

6. The method of claim 4, wherein the first module was in a first state when generating the first output dataset, and wherein the second module was in a second state when generating the second output dataset, and further comprising:
   determining, by the processing device, that the first module generated the first output dataset while in an error state;
   determining, by the processing device responsive to determining that the first module generated the first output dataset while in an error state, that the second module generated the second output dataset while in an error-free state; and
   redirecting, by the processing device responsive to determining that the second module generated the second output dataset while in an error-free state, the second output dataset to the third module of the plurality of modules without redirecting the first output dataset to the third module of the plurality of modules.

7. The method of claim 1, further comprising:
   determining, by the processing device, a change in a first module of the plurality of modules from an error-free state to an error state;
   identifying, by the processing device, a subset of modules of the plurality of modules whose respective input dataset depends on the change; and
   causing each of the subset of modules to re-generate the output dataset of the respective output requirement of the plurality of output requirements based on the input dataset of the respective input requirement of the plurality of input requirements.

8. The method of claim 7, wherein the change in the first module of the plurality of modules from the error-free state to the error state occurs after the first module of the plurality of modules generates the output dataset of the respective output requirement of the plurality of output requirements based on the input dataset of the respective input requirement of the plurality of input requirements.

9. The method of claim 1, further comprising:
   determining, by the first module of the plurality of modules, that a state of the first module changed during or after the generation of the first output dataset; and generating, by the first module, a flag indicating an invalidity of the first output dataset or a requirement for a subset of modules to re-generate a plurality of output datasets.

10. The method of claim 2, further comprising:
replacing, by the processing device, a first module of the plurality of modules with a third module of the plurality of modules;
receiving, by the processing device, a third output dataset from the third module of the plurality of modules;
determining, by the processing device, a compliance of the third output dataset to the input requirements of the second module of the plurality of modules; and
redirecting, by the processing device responsive to determining the compliance of the second output dataset to the input requirements of the second module, the third output dataset to the second module of the plurality of modules.

11. The method of claim 10, wherein the first module sends the first output dataset to the processing device using a first interface of the first module, and the third module sends the third output dataset to the processing device using a second interface, and wherein the first interface and the second interface correspond to a common interface type.

12. The method of claim 10, wherein the second output dataset is different from the first output dataset in at least one of a data format, a data value, or a data type.

13. The method of claim 2, wherein the second module is unaware that the first module of the plurality of modules generated the first output dataset.

14. The method of claim 1, wherein each module is configured to determine a capability to generate the output dataset of a respective output requirement of the plurality of output requirements based on the input dataset of a respective input requirement of the plurality of input requirements.

15. The method of claim 14, wherein each module is configured to send a message to the processing device that is indicative of the capability.

16. A system comprising:
a memory; and
a processing device, operatively coupled to the memory, to:
obtain a list of a plurality of modules executing on one or more processing devices, the plurality of modules associated with a plurality of input requirements and a plurality of output requirements, each module is configured to generate an output dataset of a respective output requirement of the plurality of output requirements based on an input dataset of a respective input requirement of the plurality of input requirements;
determine an execution order of the plurality of modules based on the plurality of input requirements and the plurality of output requirements; and
establish a plurality of connections between the plurality of modules based on the execution order.

17. The system of claim 16, wherein the processing device is further to:
receive a first output dataset from a first module of the plurality of modules; and
redirect, using one or more of the plurality of connections, the first output dataset to a second module of the plurality of modules to cause the second module to generate a second output dataset based on the first output dataset.

18. The system of claim 16, wherein the processing device is further to:
receive the second output dataset from the second module of the plurality of modules;
redirect, using one or more of the plurality of connections, the second output dataset to a third module of the plurality of modules to cause the third module to generate a third output dataset based on the second output dataset; and
redirect, using one or more of the plurality of connections, the second output dataset to a fourth module of the plurality of modules to cause the fourth module to generate a fourth output dataset based on the second output dataset.

19. The system of claim 16, wherein a first connection of the plurality of connections is between a first module of the plurality of modules and a third module of the plurality of modules, wherein a second connection of the plurality of connections is between a second module of the plurality of modules and the third module of the plurality of modules, and wherein the processing device is further to:
determine that a first output dataset that is generated by the first module is available before a second output dataset that is generated by the second module.

20. The system of claim 19, wherein the processing device is further to:
redirect, responsive to determining that the first output dataset is available before the second output dataset, the first output dataset to the third module of the plurality of modules without redirecting the second output dataset to the third module of the plurality of modules.

21. The system of claim 19, wherein the first module was in a first state when generating the first output dataset, and wherein the second module was in a second state when generating the second output dataset, and wherein the processing device is further to:
determine that the first module generated the first output dataset while in an error state;
determine, responsive to determining that the first module generated the first output dataset while in an error state, that the second module generated the second output dataset while in an error-free state; and
redirect, responsive to determining that the second module generated the second output dataset while in an error-free state, the second output dataset to the third module of the plurality of modules without redirecting the first output dataset to the third module of the plurality of modules.

22. The system of claim 16, wherein the processing device is further to:
determine a change in a first module of the plurality of modules from an error-free state to an error state;
identify a subset of modules of the plurality of modules whose respective input dataset depends on the change; and
cause each of the subset of modules to re-generate the output dataset of the respective output requirement of the plurality of output requirements based on the input dataset of the respective input requirement of the plurality of input requirements.

23. The system of claim 22, wherein the change in the first module of the plurality of modules from the error-free state to the error state occurs after the first module of the plurality of modules generates the output dataset of the respective output requirement of the plurality of output requirements based on the input dataset of the respective input requirement of the plurality of input requirements.

24. The system of claim 16, wherein the processing device is further to:
- determine, by the first module of the plurality of modules, that a state of the first module changed during or after the generation of the first output dataset; and
- generate, by the first module, a flag indicating an invalidity of the first output dataset or a requirement for a subset of modules to re-generate a plurality of output datasets.

25. The system of claim 17, wherein the processing device is further to:
- replace a first module of the plurality of modules with a third module of the plurality of modules;
- receive a third output dataset from the third module of the plurality of modules;
- determine a compliance of the third output dataset to the input requirements of the second module of the plurality of modules; and
- redirect, responsive to determining the compliance of the third output dataset to the input requirements of the second module, the third output dataset to the second module of the plurality of modules.

26. The system of claim 25, wherein the first module sends the first output dataset to the processing device using a first interface of the first module, and the third module sends the third output dataset to the processing device using a second interface, and wherein the first interface and the second interface correspond to a common interface type.

27. The system of claim 25, wherein the second output dataset is different from the first output dataset in at least one of a data format, a data value, or a data type.

28. The system of claim 17, wherein the second module is unaware that the first module of the plurality of modules generated the first output dataset.

29. The system of claim 16, wherein each module is configured to determine a capability to generate the output dataset of a respective output requirement of the plurality of output requirements based on the input dataset of a respective input requirement of the plurality of input requirements, and send a message to the processing device that is indicative of the capability.

30. A non-transitory computer-readable medium storing instructions that, when execute by a processing device, cause the processing device to:
- obtain, by a processing device, a list of a plurality of modules executing on one or more processing devices, the plurality of modules associated with a plurality of input requirements and a plurality of output requirements, each module is configured to generate an output dataset of a respective output requirement of the plurality of output requirements based on an input dataset of a respective input requirement of the plurality of input requirements;
- determine an execution order of the plurality of modules based on the plurality of input requirements and the plurality of output requirements; and
- establish a plurality of connections between the plurality of modules based on the execution order.

* * * * *